United States Patent [19]
Lock

[11] Patent Number: 6,014,904
[45] Date of Patent: Jan. 18, 2000

[54] METHOD FOR CLASSIFYING MULTI-PARAMETER DATA

[75] Inventor: Michael D. Lock, Mountain View, Calif.

[73] Assignee: Becton, Dickinson and Company, Franklin Lakes, N.J.

[21] Appl. No.: 08/962,970

[22] Filed: Oct. 27, 1997

Related U.S. Application Data

[63] Continuation of application No. 08/724,560, Sep. 30, 1996, abandoned
[60] Provisional application No. 60/017,095, May 9, 1996.

[51] Int. Cl.[7] ................................................ G06F 15/46
[52] U.S. Cl. ............................................................ 73/865.5
[58] Field of Search ............................... 73/866.3, 865.5; 324/71.1, 71.4; 436/8, 4

[56] References Cited

U.S. PATENT DOCUMENTS

| | | | |
|---|---|---|---|
| 4,599,307 | 7/1986 | Saunders et al. ........................... | 435/34 |
| 4,661,913 | 4/1987 | Wu et al. . | |
| 4,704,891 | 11/1987 | Recktenwald et al. ....................... | 73/1 |
| 4,727,020 | 2/1988 | Recktenwald ............................... | 436/6 |
| 4,745,285 | 5/1988 | Recktenwald et al. ............... | 250/458.1 |
| 4,987,086 | 1/1991 | Brosnan et al. .......................... | 436/501 |
| 5,314,824 | 5/1994 | Schwartz . | |
| 5,445,939 | 8/1995 | Anderson . | |
| 5,627,040 | 5/1997 | Bierre et al. ............................ | 435/7.24 |
| 5,776,709 | 7/1998 | Jackson et al. . | |

OTHER PUBLICATIONS

Haynes, J.L., "Principles of Flow Cytometry", *Cytometry Supplement,* 3:7–17 (1988).

*Primary Examiner*—Robert Raevis
*Attorney, Agent, or Firm*—Susan A. Capello, Esq.; Eric M. Lee, Esq.; Allen W. Wark, Esq.

[57] ABSTRACT

A method for automatically classifying multi-parameter data into cluster groups for the purpose of defining different populations of particles in a sample by automatically defining a position of at least one variable position, geometric boundary surface on a two-dimensional scatter plot so as to enclose a group of the displayed particles in a data cluster; with the boundary surface having a polygonal shape defined by a plurality of vertices about at least one cell cluster created by building at least one histogram from cross sections of the two-dimensional scatter plot. Preferably, each cross section of the geometric boundary includes a rectangular, two dimensional gate. The method is particularly useful in the field of cellular analysis using, for example, flow cytometers wherein multi-parameter data is recorded for each cell that passes through an illumination and sensing region. In particular the method is especially useful for classifying and counting immunofluorescently labeled lymphocytes in blood samples from AIDS patients.

20 Claims, 10 Drawing Sheets

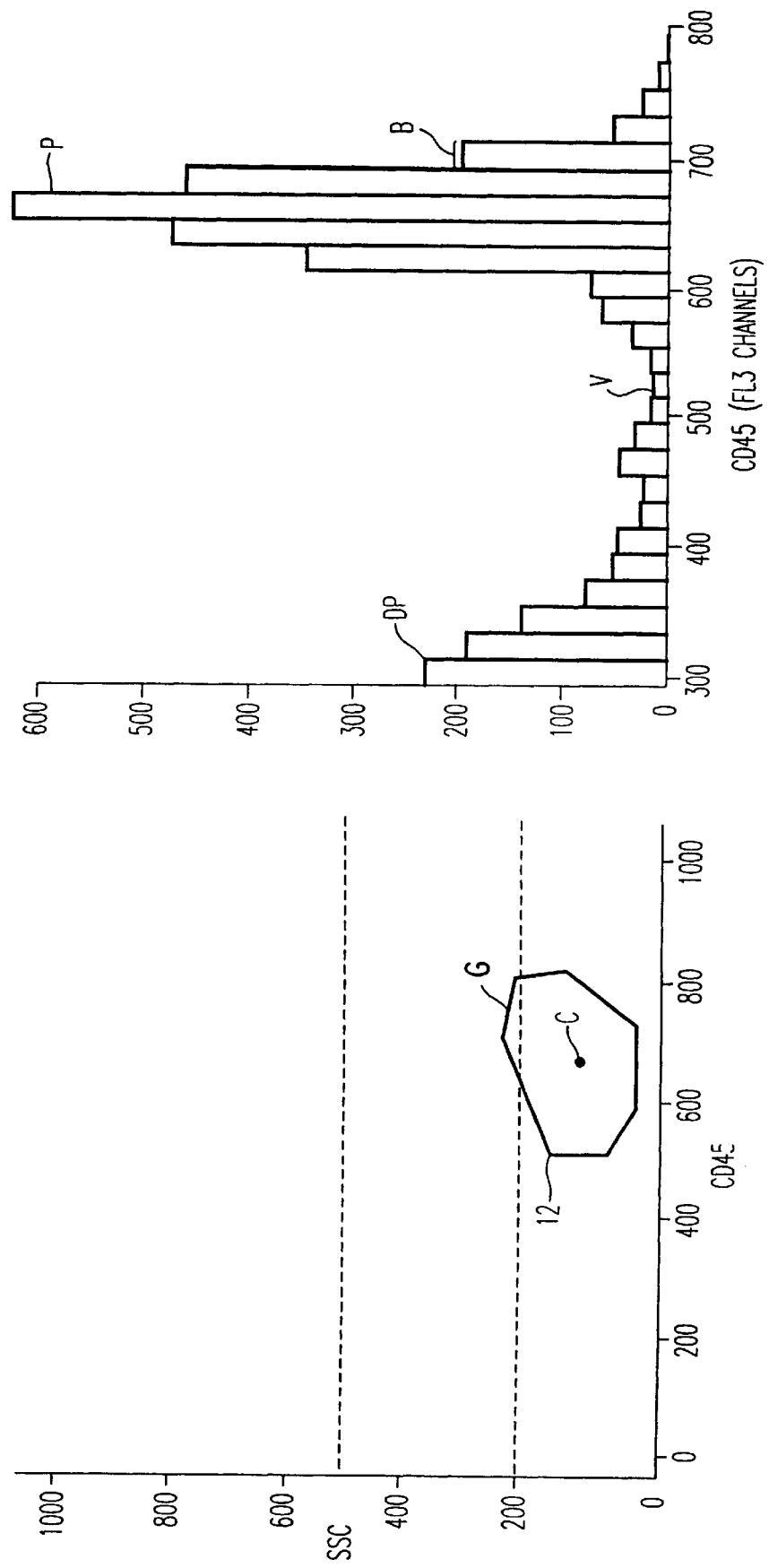

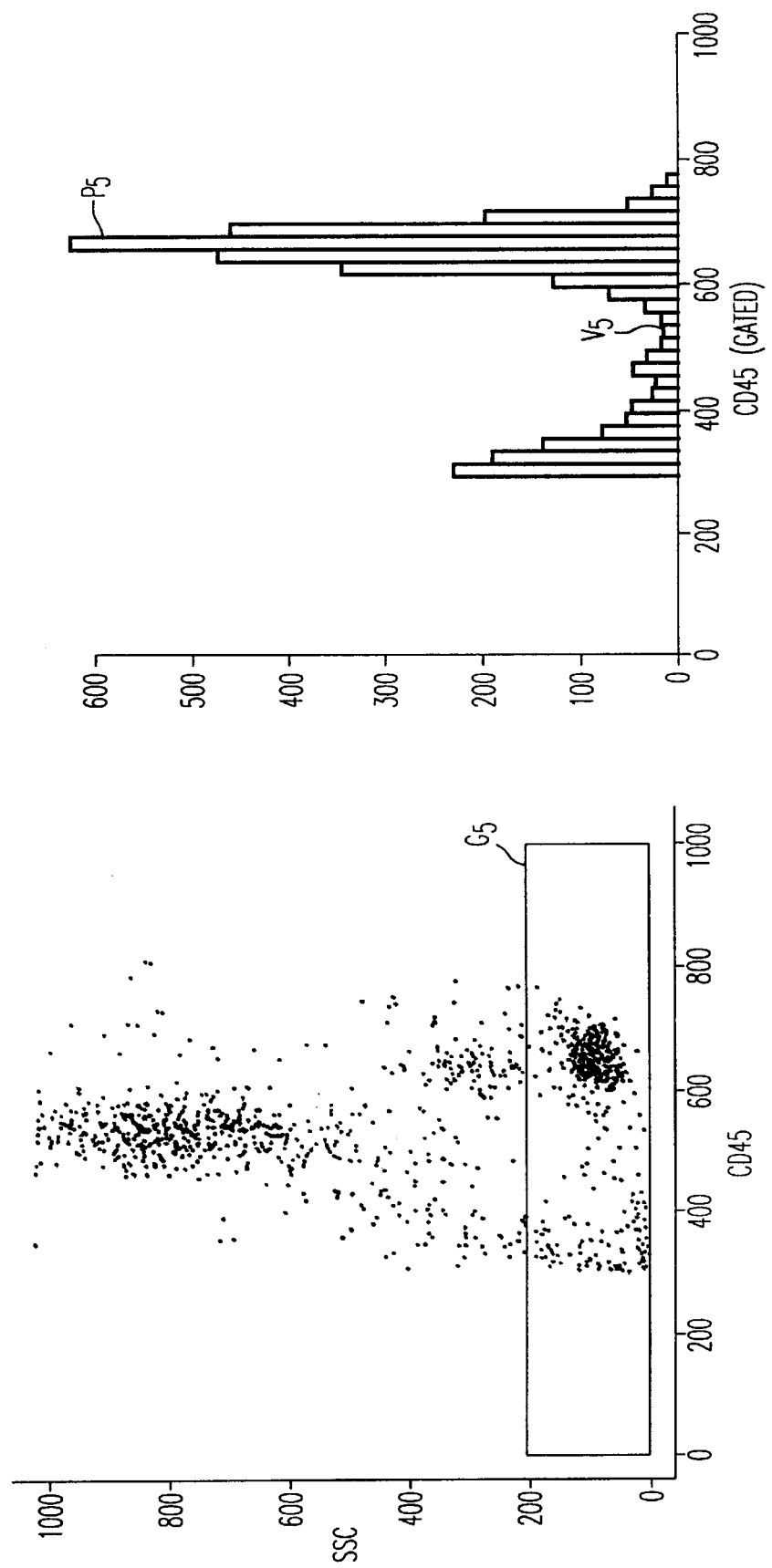

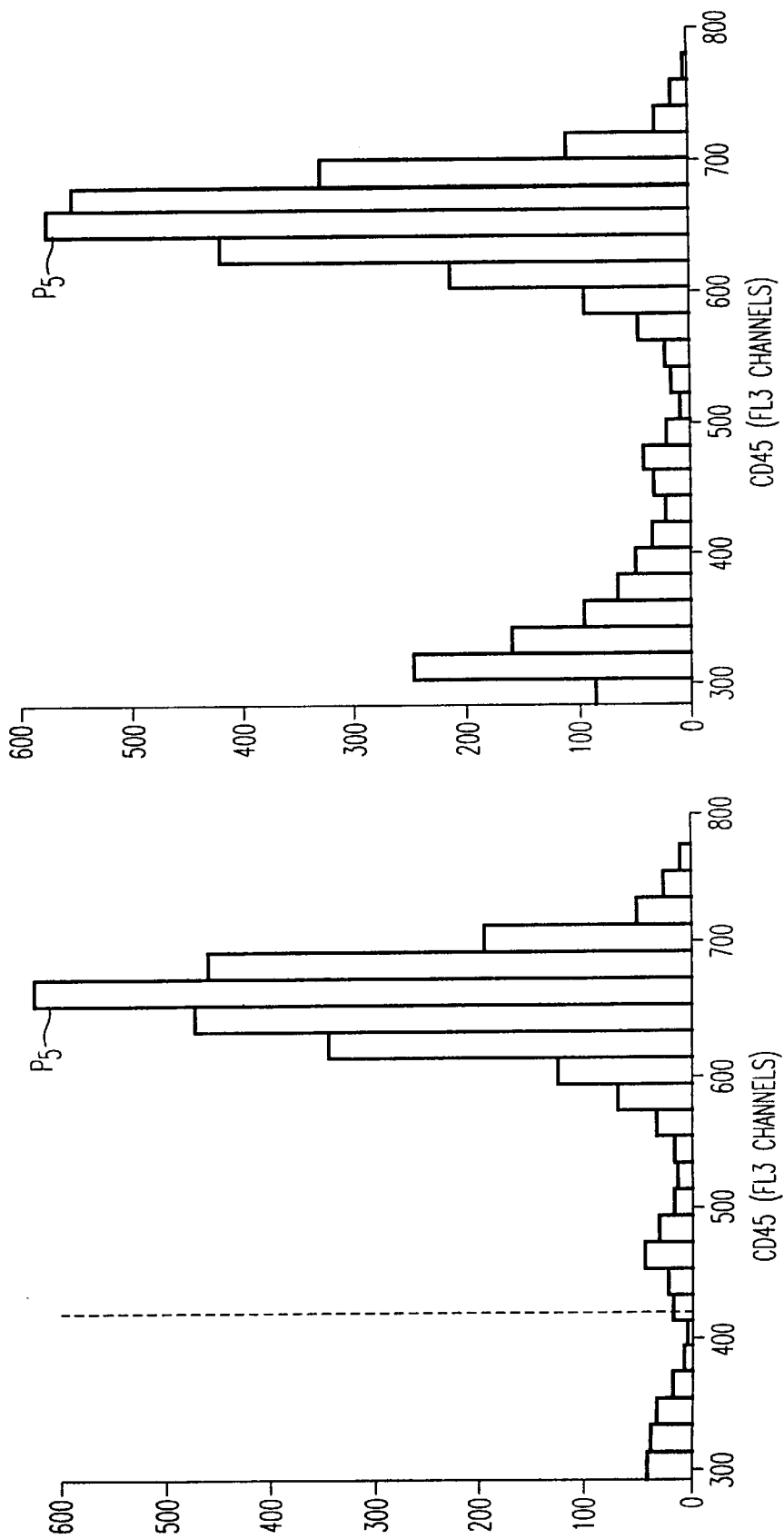

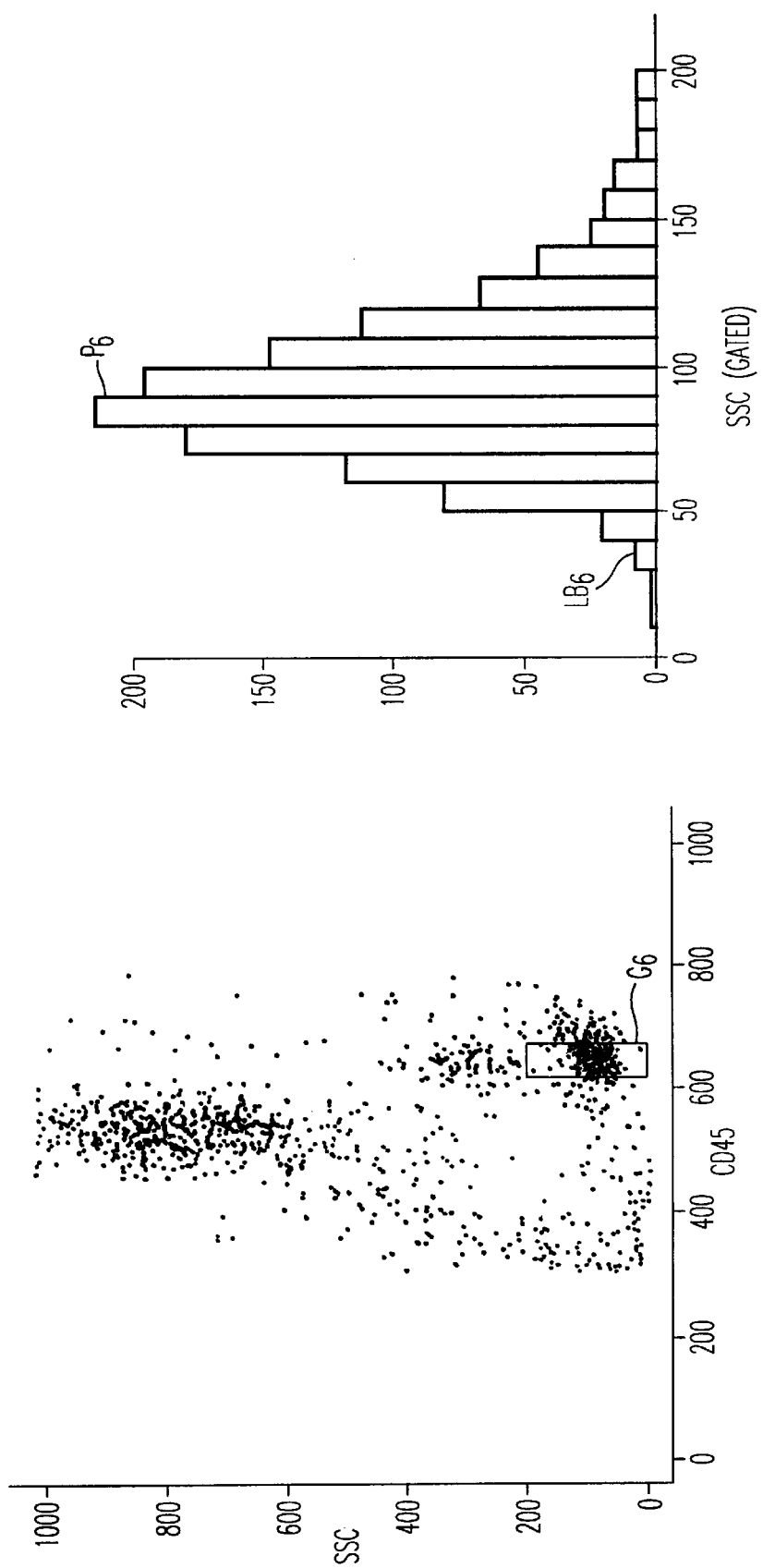

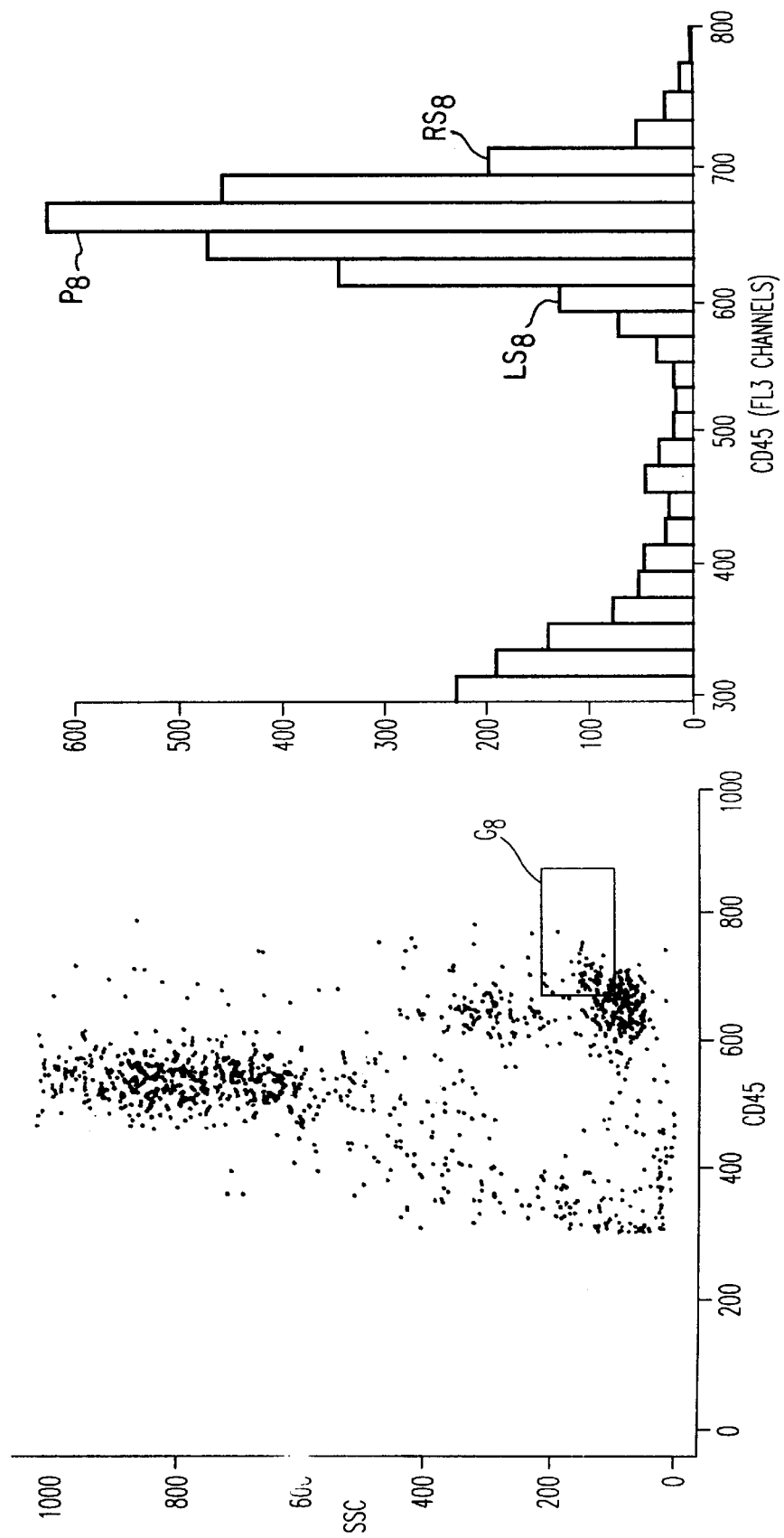

METHOD FOR CLASSIFYING MULTI-PARAMETER DATA

This application is a continuation of application Ser. No. 08/724,560, filed Sep. 30, 1996, now abandoned.

This application claims the benefit under 35 U.S.C. §119(e) of U.S. provisional application Ser. No. 60/017,095, filed May 9, 1996, said application being incorporated by reference herein in its entirety.

FIELD OF THE INVENTION

The present invention generally relates to a method for classifying multi-parameter data in real time (or from recorded data) into cluster groups for the purpose of defining different populations of particles in a sample. This invention is particularly useful in the field of cellular analysis using, for example, flow cytometers wherein multi-parameter data is recorded for each cell that passes through an illumination and sensing region. In particular the method is especially useful for classifying and counting immunofluorescently labeled lymphocytes in blood samples from AIDS patients.

BACKGROUND OF THE INVENTION

Flow cytometry, the measurement and/or separation of objects such as cells, nuclei, chromosomes and other particles in a moving liquid stream ("objects"), is well established as a valuable analysis tool in research and clinical laboratories. A discussion of the various principles, techniques and apparatus behind flow cytometry is set forth in an article by John L. Haynes, entitled "Principles of Flow Cytometry", Cytometry Supplement 3:7–17 (1988), the disclosure of which is hereby incorporated by reference.

Conventional flow cytometry devices for analyzing objects with specific characteristics basically consist of a liquid stream forming a sheath to focus the objects as they pass through an orifice associated with the analyzing or counting capabilities of the device. Usually, this type of analysis includes labeling the objects with one or more markers and then examining them for the presence or absence of one or more such markers. In the case of a cell, such as a leukocyte, tumor cell or microorganism, the marker can be directed to a molecule on the cell surface or to a molecule in the cytoplasm. Examination of a cell's physical characteristics, as well as the presence or absense of particular markers can be used to identify the population to which a cell belongs. Accordingly, there has been considerable interest in flow cytometry to analyze and sort objects. The objects can be analyzed and/or sorted at high speeds to collect tens of thousand of the objects based on a variety of chemical and physical characteristics such as size, granulation of the cytoplasm and presentation of specific antigens.

Flow cytometry comprises a well known methodology using multi-parameter data for identifying and distinguishing between different cell types in a sample. For example, the sample may be drawn from a variety of biological fluids, such as blood, lymph or urine, or may be derived from suspensions of cells from hard tissues such as colon, lung, breast, kidney or liver. In a flow cytometer, cells are passed, in suspension, substantially one at a time through one or more sensing regions where in each region each cell is illuminated by an energy source. The energy source generally comprises an illumination means that emits light of a single wavelength such as that provided by a laser (e.g., He/Ne or argon) or a mercury arc lamp with appropriate filters. Light at 488 nm is a generally used wavelength of emission in a flow cytometer having a single sensing region.

In series with a sensing region, multiple light collection means, such as photomultiplier tubes (or "PMT"), are used to record light that passes through each cell (generally referred to as forward light scatter), light that is reflected orthogonal to the direction of the flow of the cells through the sensing region (generally referred to as orthogonal or side light scatter) and fluorescent light emitted form the cell, if it is labeled with a fluorescent marker(s), as the cell passes through the sensing region and is illuminated by the energy source. Each of forward light scatter (or "FSC"), orthogonal or side light scatter (or "SSC"), and fluorescence emissions (or "FL1," "FL2," etc.) comprise a separate parameter for each cell (or each "event"). Thus, for example, two, three, four or more parameters can be collected (and recorded) from a cell labeled with two different fluorescence markers.

Flow cytometers further comprise data acquisition, analysis and recording means, such as a computer, wherein multiple data channels record data from each PMT for the light scatter and fluorescence emitted by each cell as it passes through the sensing region. The purpose of the analysis system is to classify and count cells wherein each cell presents itself as a set of digitized parameter values. Typically, by current analysis methods, the data collected in real time (or recorded for later analysis) is plotted in 2-D space for ease of visualization. Such plots are referred to as "dot plots" and a typical example of a dot plot drawn from light scatter data recorded for leukocytes is shown in FIG. 1 of U.S. Pat. No. 4,987,086, the disclosure of which is hereby incorporated by reference in its entirety. By plotting orthogonal light scatter versus forward light scatter, one can distinguish between granulocytes, monocytes and lymphocytes in a population of leukocytes isolated from whole blood. By electronically (or manually) "gating" on only lymphocytes using light scatter, for example, and by the use of the appropriate monoclonal antibodies labeled with fluorochromes of different emission wavelength, one can further distinguish between cell types within the lymphocyte population (e.g., between T helper cells and T cytotoxic cells). U.S. Pat. Nos. 4,727,020, 4,704,891, 4,599,307 and 4,987,086 describe the arrangement of the various components that comprise a flow cytometer, the general principles of use and one approach to gating on cells in order to discriminate between populations of cells in a blood sample, the disclosure of which are hereby incorporated by reference in their entireties.

Of particular interest is the analysis of cells from patients infected with HIV, the virus which causes AIDS. It is well known that $CD4^+$ lymphocytes play an important role in HIV infection and AIDS. For example, counting the number of $CD4^+$ T lymphocytes in a sample of blood from an infected individual will provide an indication of the progress of the disease. A cell count under 200 per $mm^3$ is an indication that the patient has progressed from being seropositive to AIDS. In addition to counting $CD4^+$ T lymphocytes, $CD8^+$ T lymphocytes also have been counted and a ratio of CD4:CD8 cells has been used in understanding AIDS.

In both cases, a sample of whole blood is obtained from a patient. Monoclonal antibodies against CD3 (a pan-T lymphocyte marker), CD4 and CD8 are labeled directly or indirectly with fluorescent dye. These dyes have emission spectra that are distinguishable from each other. Examples of such dyes are set forth in example 1 of U.S. Pat. No. 4,745,285, the disclosure of which is hereby incorporated by reference in its entirety. The labeled cells then are run on the flow cytometer and data is recorded. Analysis of the data can proceed in real time or be stored in list mode for later analysis.

While data analyzed in 2-D space can yield discrete populations of cells, most often the dot plots represent projections of multiple clusters. As a result, often it is difficult to distinguish between cells which fall into regions of apparent overlap between clusters. In such cases, cells can be inadvertently classified in a wrong cluster, and thus, contribute inaccuracy to the population counts and percentages being reported. In blood from an HIV infected patient for example, over-inclusion of T cells as being $CD4^+$ could lead a clinician to believe a patient had not progressed to AIDS, and thus, certain treatment which otherwise might be given could be withheld. In cancers, such as leukemia, certain residual tumor cells might remain in the bone marrow after therapy. These residual cells are present in very low frequencies (i.e., their presence is rare and thus their occurrence in a large sample is a "rare event"), and thus, their detection and classification are both difficult and important.

One known method for solving this problem relies on a gravitational attractor consisting of a geometric boundary surface of fixed size, shape and orientation, but of variable position, and a computational engine by which the boundary surface positions itself optimally to enclose a cluster of multi-parameter events, with multiple attractors for simultaneously classifying multiple clusters of events within the same datastream or recorded data distribution. The strategy is to assign one attractor per population to be identified and/or sorted. This method is described in co-pending application Ser. No. 08/039,465, now U.S. Pat. No. 5,627,040, the disclosure of which is hereby incorporated by reference in its entirety. However, there are some limitations to this method, namely that because of the fixed size, shape and orientation of the boundary surface some cells can be inadvertently classified in a wrong cluster or omitted from inclusion within the boundary, and thus, contribute inaccuracy to the population counts and percentages being reported.

Thus, there has been a need for a method for more accurately discriminating between clusters of cells, and thus, more accurately identifying and/or sorting cells into different populations. In addition, there has been a need for a method which could more accurately predict if the sample had been handled properly and analyzed in a timely manner. Finally, there has been a need for a method which could more accurately predict if the preparative conditions used by the technician were done properly, e.g., improper staining techniques leading to non specific staining or pipetting improper amounts of reagent(s) and/or sample(s). Thus there has also been a need for a method to determine typical lymphocyte patterns, to assess variation of individual lymphocyte subsets in patterns, to improve gate size and shape, to maximize lymphocyte recovery and lymphocyte gate purity, and to determine how gate contaminants potentially affect gated data.

SUMMARY OF THE INVENTION

In contrast to the prior methods and techniques discussed above, the present invention provides an improved method, that is particularly suited for classifying multi-parameter data into cluster groups of objects such as cells, particles and the like.

The automated method of the present invention for selecting particles in at least one sample into one or more data clusters includes the steps of automatically collecting a plurality of parameters for each of a plurality of particles in a sample, automatically displaying each particle on a two-dimensional scatter plot, and automatically defining a position of at least one variable position, geometric boundary on the two-dimensional scatter plot so as to enclose a group of the displayed particles in a data cluster; said boundary having a polygonal shape defined by a plurality of vertices about at least one cell cluster created by building at least one histogram from cross sections of the two-dimensional scatter plot.

In the preferred embodiment, the geometric boundary is positioned on the two-dimensional scatter plot so as to enclose a group of the displayed particles in a data cluster, with each cross section of the geometric boundary including a rectangular, two dimensional gate. Also, each bin selected from said histogram is larger than a single channel, and preferably at least 20 channels.

BRIEF DESCRIPTION OF THE DRAWINGS

The various features, objects, benefits, and advantages of the present invention will become more apparent upon reading the following detailed description of the preferred embodiment along with the appended claims in conjunction with the drawings, wherein like reference numerals identify corresponding components, and:

FIG. 2 is a schematic representation of a gate drawn in accordance with the method of the present invention;

FIG. 4 is a histogram illustrating bin sizes of 20 channels;

FIG. 5A is a two-dimensional scatter plot of SSC vs. CD45, and FIGS. 5B, 5C and 5D are histograms of the two-dimensional scatter plot illustrated in FIG. 5A using different beginning origins for the first bin in each histogram;

FIG. 6A is a two-dimensional scatter plot of SSC vs. CD45 and FIG. 6B is a histogram of the two-dimensional scatter plot illustrated in FIG. 6A;

DETAILED DESCRIPTION OF THE PREFERRED EMBODIMENT

The present invention is illustrated in FIGS. 1–9 and includes a method for classifying multi-parameter data or events into cluster groups of objects, such as cells, particles and the like, as they arrive from an array of sensors such as the light collection means of a flow cytometer. It also functions in the post-classification of recordings of multi-parameter events in list mode or database format. It is particularly useful in clustering multi-parameter data from lymphocytes labelled with immunofluorescent markers in blood samples from AIDS patients.

With the advent of 3-color flow cytometry, reagent combinations have emerged which employ alternative techniques to identify and enumerate lymphocyte subsets. Traditional flow cytometric strategies rely primarily on FSC and 90° light scatter or SSC to select or "gate" the lymphocyte population for analysis. Lymphocyte gate purity and recovery are objective measurements of gate quality in 2-color light scatter-gated flow cytometry, and gate quality is believed to be an indicator of the reliability of subsequent immunophenotyping results. Purity and recovery are traditionally assessed by using CD45/CD14 fluorescence to characterize white blood cell populations and debris seen in FSC vs. SSC plots. The information obtained is then used in either manual or automated analysis to obtain a lymphocyte gate which captures as many lymphocytes as possible while minimizing contamination. However, in contrast to light scatter and CD45/CD14 gating, 3-color flow cytometry allows the inclusion of an internal leukocyte identity marker (CD45) in each monoclonal antibody combination. In each tube of a monoclonal antibody panel, lymphocyte identity can be established while enumerating lymphocyte subsets.

A. GENERAL DESCRIPTION OF THE METHOD

Figure 1:
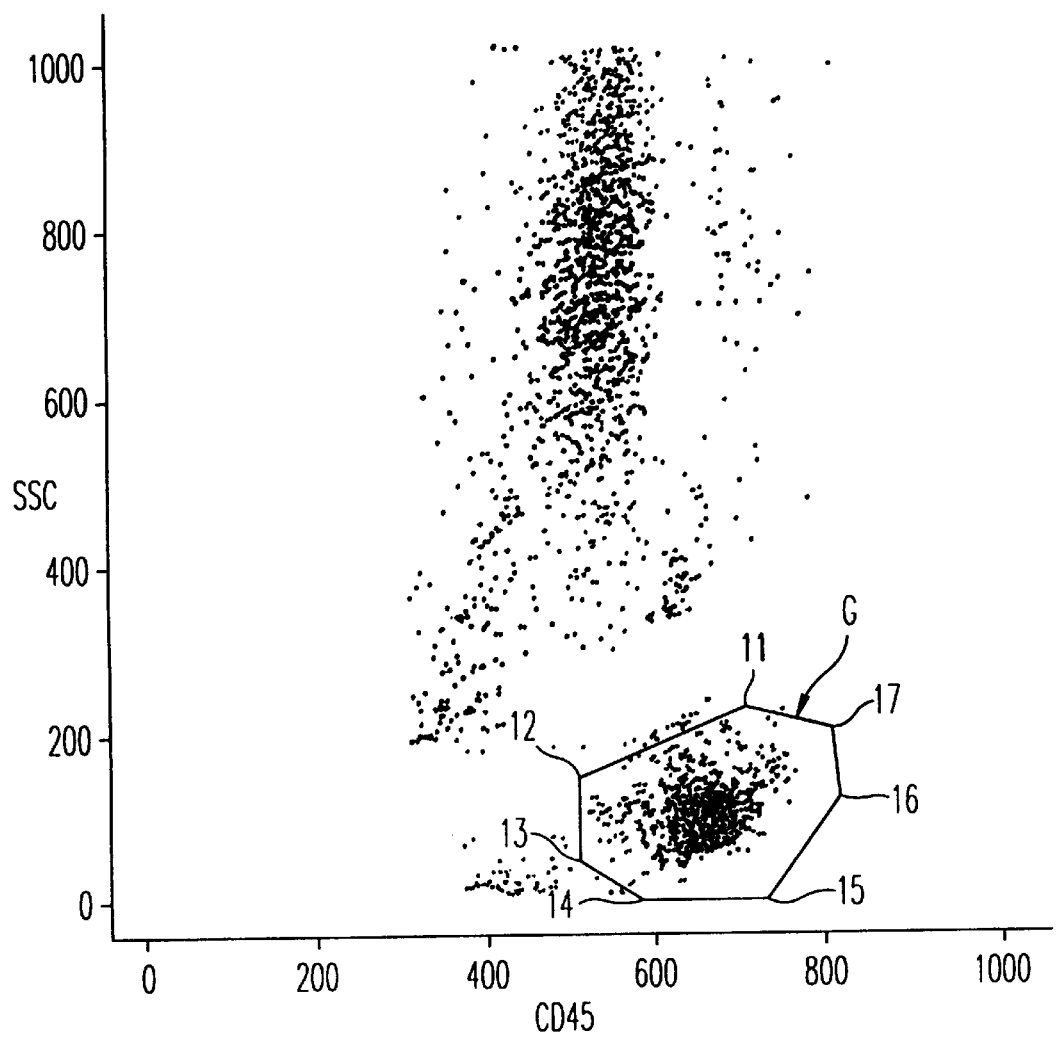
FIG. 1 is a two-dimensional scatter plot illustrating a gate drawn in accordance with the method of the present invention.

The method of the present invention preferably includes two stages to enumerate lymphocyte subsets such as T, B and NK cells. As its name implies, the lymphocyte gate is used to identify lymphocytes based on CD45 intensity and orthogonal or side light scatter ("SSC") characteristics. After they are identified, the lymphocytes are then classified into subsets using gravitational attractors. An example of a typical gate G drawn automatically by the algorithm is shown in FIG. 1. In the preferred embodiment, the algorithm produces a gate G having a polygonal shape with preferably seven veitices 11–17. A polygon gate G with seven vertices is flexible enough to encompass nearly every lymphocyte population that may be encountered. In this way, one vertex 11 aims for the valley between lymphocytes and monocytes, one vertex 12 aims for the valley between lymphocytes and debris, one 13 is cut at an angle to reduce debris encroachment, and the vertices 14–17 along the right side of the gate are loose since there are no other populations nearby.

The algorithm has the ability to locate and gate lymphocyte clusters as long as they are located within the bottom half of the SSC vs. CD45 scatter diagram. Additionally, the algorithm can adjust the size and the shape of the gate G as needed to accommodate changes in the shape of the lymphocyte population, again subject to some limitations. Referring to FIG. 2, these limitations and requirements are, for example, that the lymphocyte cluster must not extend higher than 500 SSC, the distance from the center of the lymphocytes C to the left boundary or vertex 12 must not be more than 160 channels, and at least part of the lymphocyte cluster must extend below 200 SSC.

Figures 3A, 3B:
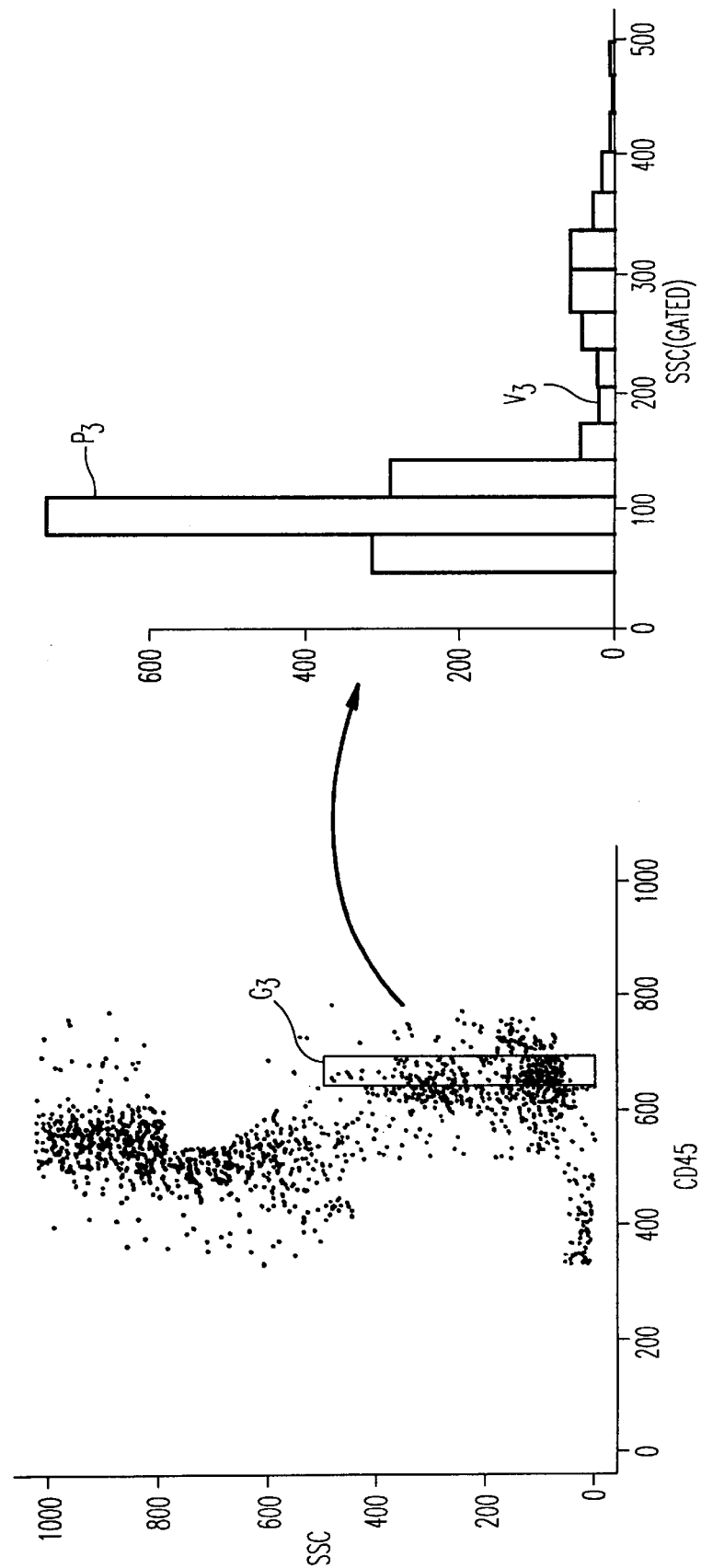
FIG. 3A is a two-dimensional scatter plot of SSC vs. CD45
FIG. 3B is a histogram of the two-dimensional scatter plot illustrated in FIG. 3A.

The principal strategy employed by the algorithm is to build histograms from slices or cross sections through the SSC vs. CD45 scatter diagram or plot. The cross-section slice is visualized by using a rectangular, two dimensional gate $G_3$ as shown in FIG. 3A. The gates or slices must be carefully positioned so that they reveal as much as possible about the structure of the underlying populations. For example, in FIG. 3A the slice or gate $G_3$ is taken directly through the horizontal center of the lymphocyte cluster and into the monoryte cluster. Thus, a histogram of the SSC data from the slice clearly shows the peak $P_3$ of the lymphocyte cluster as well as the valley $V_3$ between the lymphocytes and the monocytes to the right of the diagram.

Throughout the algorithm, gate boundaries, distances and locations are usually derived from the characteristics of one-dimensional histograms created from cross-sections through the data. For example, the location of the left boundary of the lymphocyte gate is set to the midpoint of the valley that can be seen between two peaks in a histogram of the CD45 parameter. (The details of how the peak and valley are found are discussed below in Section B.)

An important feature of this histogram, and of all of the other histograms used in the algorithm, is that it uses bins that are larger than a single channel. In the preferred embodiment, for example, the bin size is 20 channels; i.e., the height of each bar in the histogram is the sum of the event counts in 20 adjoining channels as illustrated in FIG. 4. Other histograms in the algorithm utilize different bin widths with the actual bin width in a particular situation depending on the number of events expected in the histogram and the purpose of the histogram. For instance, a histogram used to find the valley between two dense clusters will use a wider bin size than a histogram used to find a peak. In general, bin width should be wider if the histogram is relatively flat and unchanging or when there are few events, and the width should be narrower if the shape of the histogram is more complicated or there are many events. The theory underlying these general rules is disclosed, for example, in *Multivariate Density Estimation* by D. W. Scott (Wiley, 1992), the disclosure of which is hereby incorporated by reference in its entirety.

The use of binning means that histogram bins and channels do not correspond on a one to one basis. Thus, there must be a convention for converting distances and coordinates in channel values to histogram bins and vice versa. With reference to FIG. 4, the following conventions are used throughout the algorithm:

DP is the debris peak.

P is the lymphocyte peak.

Each bin B is 20 channels wide.

The left gate boundary or vertex 12 is midpoint of the lowest bin between the lymphocyte peak P and the debris peak.

Let the bins of a histogram be defined as

| Bin | Starting Value | Ending Value | No. of Events in Bin |
|---|---|---|---|
| 1 | $b_1$ | $b_2$ | $h_1$ |
| 2 | $b_2$ | $b_3$ | $h_2$ |
| . | . | . | . |
| . | . | . | . |
| . | . | . | . |
| n | $b_n$ | $b_{n+1}$ | $h_n$ |

(1) Histogram construction: An event x is placed in bin i if $b_i < x \leq b_{i+1}$.

(2) Converting histogram bins to channel numbers: The midpoint of the bin becomes the channel number, i.e. bin i is converted to channel x, by $x \leftarrow (b_i + b_{i+1})/2$ (3) Converting channel numbers to histogram bins: This follows the same rule as for constructing histograms.

The conversion conventions can be illustrated using the histogram shown in FIG. 4. This type of histogram is used in the analysis software to determine the location of the left boundary of the lymphocyte gate using a procedure described below in Section B. Briefly, the algorithm first finds the center of the lymphocyte cluster by searching for the first "large" peak P on the right side of the histogram. In the histogram shown in FIG. 4, this large peak occurs in the 19th bin from the left side. From Table 1, it is seen that this bin, which can be called the peak bin, contains 627 events and that it begins at channel 654 and ends at channel 674. Following convention (2) above, the peak P is defined as the midpoint of the peak bin, i.e. the peak occurs at channel 664.

Next the algorithm attempts to identify the valley V between the lymphocyte and debris clusters by searching for the lowest bin in the histogram within 160 channels to the left of the lymphocyte peak. In the example here, this means searching for the lowest bin between channels 504 and 664. Following convention (3), channel 504 corresponds to bin 11. Another requirement in the software restricts the search for the minimum to begin at the next bin to the right, i.e., at the twelfth bin. This restriction is not an element of the conventions described above, but rather, is specific to this portion of the algorithm. The lowest bin between the 12th and 19th bins is bin 12 containing 16 events. Again using convention (2), this is converted to channel 524. Thus, the left boundary of the lymphocyte gate is set to channel 524.

TABLE 1

Values used in constructing the histogram in Figure 4.

| i | $b_i$ | $b_{i+1}$ | $h_i$ |
|---|---|---|---|
| 1 | 294 | 314 | 231 |
| 2 | 314 | 334 | 191 |
| 3 | 334 | 354 | 139 |
| 4 | 354 | 374 | 78 |
| 5 | 374 | 394 | 53 |
| 6 | 394 | 414 | 48 |
| 7 | 414 | 434 | 27 |
| 8 | 434 | 454 | 24 |
| 9 | 454 | 474 | 47 |
| 10 | 474 | 494 | 33 |
| 11 | 494 | 514 | 18 |
| 12 | 514 | 534 | 16 |
| 13 | 534 | 554 | 18 |
| 14 | 554 | 574 | 35 |
| 15 | 574 | 594 | 72 |
| 16 | 594 | 614 | 129 |
| 17 | 614 | 634 | 347 |
| 18 | 634 | 654 | 475 |
| 19 | 654 | 674 | 627 |
| 20 | 674 | 694 | 462 |
| 21 | 694 | 714 | 199 |
| 22 | 714 | 734 | 54 |
| 23 | 734 | 754 | 27 |
| 24 | 754 | 774 | 12 |
| 25 | 774 | 794 | 2 |
| 26 | 794 | 814 | 0 |

B. Find Left Boundary of the Lymphocyte Gate

Algorithm Steps

1. Extract the events that fall within the rectangular slice (gate $G_s$) shown in FIG. 5A.
   a. Rectangle: lower left corner=(0,0), upper right corner=(1000,200).
   b. Events on the rectangle boundary are not included.
2. Create a histogram of the CD45 data from the rectangle-gated events.
   a. First bin begins at min(gated CD45 data)−1.
   b. Bin width is 20.
   c. Histogram has enough bins to contain all of the gated CD45 data. Call this histogram, shown in FIG. 5B, CD45.hist—it will be used again in a later section of the algorithm.
3. Searching from the right side of the CD45 histogram, find the first large peak. The peak $P_5$ is the midpoint of the first bin found that satisfies the following conditions:
   a. It contains more events than either of the two adjacent bins to its left.
   b. It contains at least 5% of the events that are to the right of channel 480 in the histogram.
   c. It contains at least 10 events. If these conditions are never met during the search, the midpoint of the second bin from the left is designated as the peak. Let $h_{max}^{CD45}$ be the number of events in the bin containing the peak—it will be used again in a later section of the algorithm.
4. Find the bin containing the fewest events (the lowest bin or valley $V_s$) in the histogram that is between bin β and the peak bin, inclusive.
   a. Let α=max (min(gated CD45 data), lymphocyte peak−160)
   b. β is the lowest positive integer i that satisfies $b_i \geq \alpha$.
5. The midpoint of the channel where the minimum occurs marks the left boundary of the lymphocyte gate.

Rationale

With respect to Step 1, gating through the rectangular gate is used to select a subsample that contains at least a portion of the lymphocytes and that excludes a majority of the granulocytes and monocytes. It is not essential to eliminate all non-lymphocytes or to include all the lymphocytes; hence the exact limits of the gate are not crucial. The coordinates used here performed adequately on every file tested during training and validation.

With respect to Step 2, a bin,width of 20 was chosen to allow for discrimination of both the lymphocyte peak and the valley. This choice is somewhat smaller than optimal for finding a valley but was chosen as a compromise since it is important to find the peak as well. The choice also relies on the assumption that there will be about 2000 lymphocytes in the histogram.

With respect to Step 3, Sub-Step 3a is needed to protect against a small peak, e.g. one event on the far right side of the histogram, being misidentified as the lymphocyte cluster center. This type of error can be avoided by simply requiring the lymphocyte peak to contain a substantial number of events. Also, Sub-Step 3b follows such a tack by essentially requiring that at least 5% of the lymphocytes fall in the peak bin. The only problem with this approach is that the lymphocytes have not yet been identified at this point in the algorithm. In practice, however, this is not cause for much concern since even a very inexact identification of lymphocytes is needed to prevent gross errors such as mislabeling a few outlying events as the cluster center. Here, the lymphocytes are defined (inexactly) to be all the events that are to the right of channel 480. This value was chosen empirically from 60 training files. Specifically, lymphocyte gates were drawn and checked for quality on each file; 480 was the average location of the left boundary of the gates.

The value 480 is certainly not critical to the performance of the software since any of a wide range of channel values would produce exactly the same results. However, there is always the potential for problems any time channel numbers are hardwired directly into the software. Such problems might arise if the algorithm is adopted for a slightly different use at some later date, possibly leading to a situation where "greater than 480" is no longer a reasonable, albeit inexact, definition of lymphocytes. An easy way to reduce the potential for a problem such as this is to allow the inexact definition of lymphocyte to change from file to file. This can be done by changing the constant 480 to a variable equal to the left boundary of the "live gate" used during acquisition.

With respect to Step 4, Sub-Step 4a contains the strictest assumption made anywhere in the lymphocyte gating algorithm. In essence it implies that the distance (along the CD45 dimension) between the center and the left edge of the lymphocyte clusters does not exceed 160 channels. This assumption has not been violated by any of the good quality samples in over 200 training and test files from several different clinical sites. Poor quality samples, however, frequently do not satisfy this assumption—an important fact which is exploited by the 3-color quality control software.

The reason such a strong assumption about the size of the lymphocyte cluster is made is related to CD45 triggering and is best explained with an example. The histogram shown in FIG. 5C is meant to simulate a situation where an operator has changed the CD45 threshold from channel 294 to channel 420 during acquisition. This might happen if someone monitoring the acquisition thought that too much debris was being allowed into the FCS file. Other than this change, the data are identical to those shown in FIG. 5B, a fact which can be verified easily by examining the size and location of the lymphocyte peak in each graph. However, the histograms in FIGS. 5B and 5C show quite different patterns near the left boundary of the lymphocyte cluster, and it is not difficult to imagine how an automated algorithm might have trouble discerning where the lymphocytes end and the debris begin. The problem is that the change in threshold makes the debris seem much more minimal than it truly is. To avoid this potential problem, the algorithm is constrained to place the boundary of the lymphocyte gate somewhere within 160 channels of the lymphocyte peak.

With respect to Step 4, Sub-Step 4b is a simple condition designed to avoid the possibility of being misled by a "half empty" bin. Consider the example histogram shown in FIG. 5D that was constructed from the exact same events used to make the histogram in FIG. 5B. The only difference between the histograms is in their origins: The first bin in FIG. 5B begins at channel 294 while the first bin begins at channel 284 in FIG. 5D. This small difference leads to a slightly misleading histogram in that it gives the false impression that there is less debris near the threshold than farther to the right. The real reason for this artifact is that since there is a threshold in middle of the first bin, the bin contains the events from only 10 channels instead of from 20 channels like in all the other bins. Thus, the first bin can be called "half empty."

It is possible that a half empty bin could arise during the search for the valley between the debris and the lymphocytes. In Step 4 a it was determined that the search for the valley would begin in a bin that is $\alpha$ channels to the left of the lymphocyte peak. However, this bin might also contain the CD45 threshold, and thus, could be half or partly empty. Sub-Step 4b ensures that the search will begin in a bin that contains events from 20 channels.

Four objects are obtained from this part of the algorithm that are used elsewhere:
(1) The lymphocyte peak, which is called xCtr or the CD45 lymphocyte cluster center,
(2) The left boundary of the lymphocyte gate which was found in Step 5,
(3) The entire histogram of gated CD45 data called CD45.hist,
(4) $h_{max}^{CD45}$, the number of events in the bin that contains the peak of CD45.hist.

C. Find the Lower Boundary of the Lymphocyte Gate

This part of the algorithm uses two values from Section B which are referred to below by the following variable names:

xCtr=the CD45 lymphocyte cluster center found in Section B x.Left.Lymph=the left boundary of the lymphocyte gate found in Section B.

Algorithm Steps
1. Extract the events that fall within the rectangular gate $G_6$ shown in FIG. 6A.
   a. Left boundary=x.Left.Lymph+2/3*(xCtr−x.Left.Lymph).
   b. Right boundary=xCtr
   c. Lower boundary=0.
   d. The upper boundary is fixed at 500.
   e. Events on the rectangle boundary are not included.
2. Create a histogram of the SSC data from the rectangle-gated events.
   a. First bin begins at channel 0.
   b. Bin width is 10.
   c. Histogram has enough bins to contain all of the gated SSC data.
3. Find the maximum (peak $P_6$) of the SSC histogram. If more than one bin attains the maximum, choose the farthest left of these bins to be the peak bin. Let $h_{max}$ denote the number of events in the peak bin (i.e., the height of the peak bin).
4. Searching to the left from the peak bin, find the first bin in the histogram that contains fewer than $0.075*h_{max}$ events, as shown in FIG. 6B.
   a. Call the first bin to the left of the peak that satisfies this condition the low bin $LB_6$.
   b. If no bin satisfies this condition, set the lower boundary of the lymphocyte gate to 0.
5. Starting from the low bin, search to the left for where the histogram stops dropping sharply and begins to either flatten out or rise sharply. To make this more rigorous, recall the notation introduced in Section A, namely that the ith bin of a histogram contains the $h_i$ events between channels $b_i$ and $b_{i+1}$. Let $\Delta_j$ denote the difference in the number of events between binj and the bin to its right, bin j+1:

$$\Delta_j = h_j - h_{j+1}.$$

A difference is considered "small" if $$|\Delta_j| \leq 0.025*(h_{max}+1),$$

and can be called large otherwise. The algorithm begins at the low bin and searches to the left until it runs out of bins or one of the following conditions is met:
   a. There are two consecutive small $\Delta$s.
   b. A large positive $\Delta$ is encountered.

The lower boundary of the lymphocyte gate is set to the lower boundary of the bin where the search stops, or it is set to 0 if neither of the above conditions is satisfied. This part of the algorithm is detailed in the pseudo code below:

n.flat.moves←0
j←low
repeat{
$\Delta_j$←$(h_j-h_{j+1})/(h_{max}+1)$
if ($\Delta_j$<−0.025) //Big drop, move boundary to the left
    n.flat.moves←0
else if ($|\Delta_j|\leq 0.025$) //Flat area, move boundary to the left
    n.flat.moves←n.flat.moves+1
else break //Big rise, do not move boundary
if (n.flat.moves≧2 or j≦1) //Allow no more than 2 moves through flat area break else
   j←j-1
}
return($h_j$)

The lower boundary of the lymphocyte gate, y.Lymph.Bottom, is set to $h_j$. One value obtained from this part of the algorithm is used elsewhere:
(1) y.Lymph.Bottom, the lower boundary of the lymphocyte gate found in Step 5.

D. Find the Boundary between the Lymphocyte and Monocyte Clusters

Delineating the boundary between the lymphocyte and monocyte clusters is the most challenging part of the gating algorithm, and hence, it involves the most complicated code. The job is divided into the following main subtasks:

Subtask 1. Determine lymph. edge—a bound on how far the lymphocyte cluster can stretch in the SSC dimension: Specifically, the boundary between the lymphocytes and the monocytes is constrained to lie between the peak of the lymphocytes (in SSC) and lymph.edge. The idea is similar to the procedure used in Section B where the boundary between the lymphocytes and the debris was constrained to be within 160 channels of the CD45 cluster center. The difference here is that lymph.edge is determined from the data on a file by file basis instead of being a fixed number of channels.

Subtask 2. Determine SSC.right.valley—the valley between the lymphocytes and monocytes seen in a histogram of data sliced from the middle of the lymphocyte cluster.

Subtask 3. Determine SSC.left.valley—the valley between the lymphocytes and monocytes in a histogram from a slice of data to the left of the center of the lymphocyte cluster.

Subtask 4. Determine the slope and intercept of the line marking the upper boundary of the lymphocyte gate. This is done by fitting a line between SSC.right.valley and SSC.left.valley, although the line is not constrained to interpolate either point.

This part of the algorithm makes use of several values that were determined earlier in Sections B and C. These are referred to by the following variable names in the description below:

xCtr=CD45 lymphocyte cluster center found in Section B, Step 3, x.Left.Lymph=left boundary of the lymphocyte gate found in Section B, Step 5, y.Lymph.Bottom=lower boundary of the lymphocyte gate found in Section C, Step 5.

Algorithm Steps

Subtask 1: Determine lymph. edge $LE_7$.
1. Extract the events that fall within the rectangular gate $G_7$ shown in FIG. 7A. The coordinates of this rectangle are defined as follows:
   a. Left boundary=x.Left.Lymph+5/6*(xCtr−x.Left.Lymph).
   b. Right boundary=x.Left.Lymph+7/6*(xCtr−x.Left.Lymph).
   c. Lower boundary=y.Lymph.Bottom which is 0.
   d. The upper boundary is fixed at 500.
   e. Events on the rectangle boundary are not included.
2. Create a histogram of the SSC data from the rectangle-gated events.
   a. First bin begins at y.Lymph.Bottom−16.
   b. Bin width is 32.
   c. Histogram has enough bins to contain all of the gated SSC data.
   d. Let $(b_i^R, b_{i+1}^R)$ denote the boundaries of ith bin. (R is for right.)
   e. Let $h_i^R$ denote the number of events in the ith bin.
3. Searching from the left side of the SSC histogram, find the first large peak. This is done almost exactly as in Step B.3 only here the search is from the left instead of the right. Specifically, the peak is the midpoint of the first bin found in the search that satisfies the following conditions:
   a. It contains more events than either of the two adjacent bins to its right.
   b. It contains at least 5% of the events in the entire histogram.

If these conditions are never met during the search, the midpoint of the second bin from the right is designated as the peak.

Figure 7B:
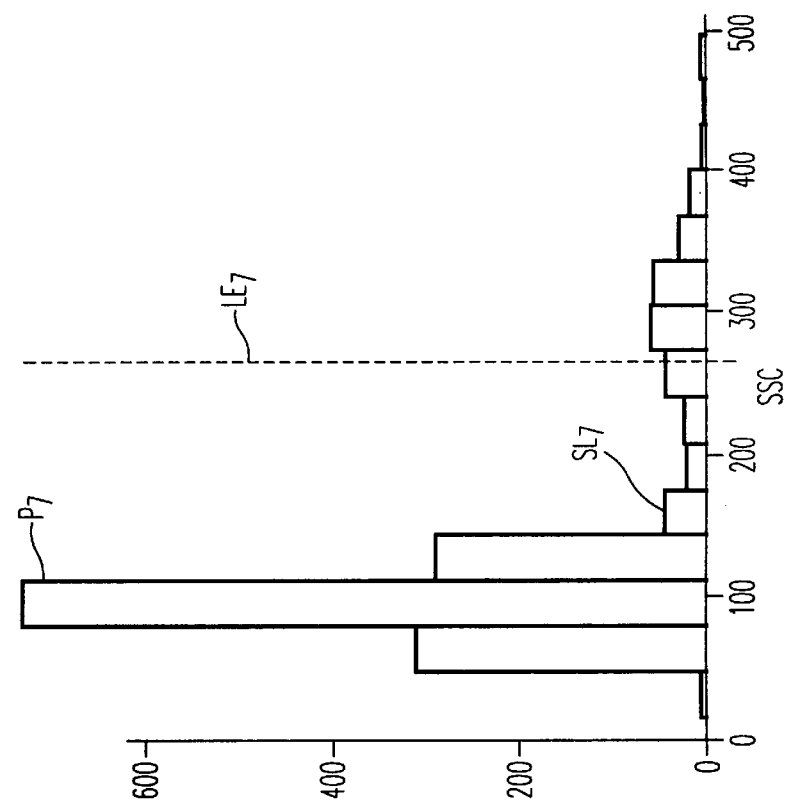
FIG. 7B is a histogram of the two-dimensional scatter plot illustrated in FIG. 7A.
Figure 7A:
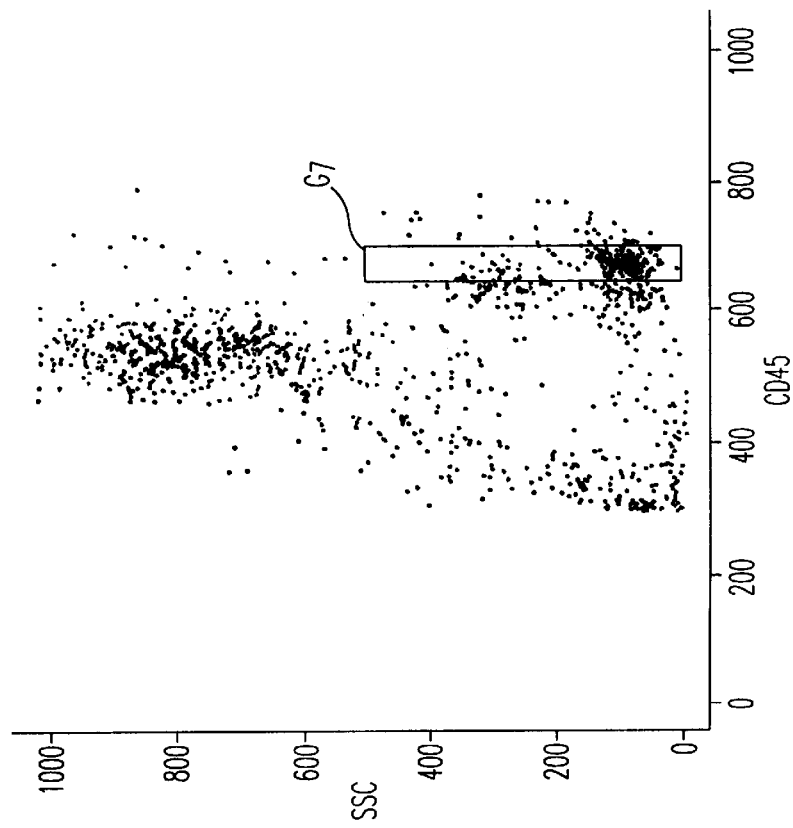
FIG. 7A is a two-dimensional scatter plot of SSC vs. CD45 with a rectangular gate

The location of this peak is referred to as yCtr in the pseudo code below although it will sometimes be called the SSC lymphocyte cluster center in the text. Let $h_{max}^R$ denote the number of events in the bin (i.e., the height of the bin) containing yCtr.
4. Starting from the SSC lymphocyte center, search to the right in the histogram for the first bin that contains fewer than $0.2*h_{max}^R$ events, as shown in FIG. 7B. This is done similarly to the procedure used in step C.4 except that here the search is constrained in how far it can extend to the right. Specifically, the search can proceed up to but no farther than the kth bin, where k is the largest integer that satisfies both of the following conditions:
   a. $b_{k+1}^R \leq$ maximum data point in the slice.
   b. $b_k^R \leq$ yCtr+150.

The first condition eliminates the bin containing the event with the largest SSC value in the slice, as well as any (necessarily empty) bin to the right of it. If the histogram has been constructed with only enough bins to span the data, this would be the last bin on the right. The second condition eliminates all the bins to the right of the one containing the value yCtr+150.

Let shoulder.location=the midpoint of the first bin that contains fewer than $0.2*h_{max}^R$ events. If no bin within the constrained search meets this criterion, then shoulder. location $SL_7$ should be set to the midpoint of bin k.
5. Set lymph.edge←y.Lymph.Bottom+1.65* (shoulder.location−y.Lymph.Bottom).

Subtask 2: Determine SSC.right.valley.
6. Find the bin containing the fewest events (the lowest bin) in the histogram that is between bin $\beta^R$ and the peak bin, inclusive, where $\beta^R$ is the greatest positive integer i that satisfies $b_{i+1}^R \leq$ lymph.edge.

If there is a tie for the lowest bin, denote the leftmost of the tied bins as the lowest bin.

Figures 7C, 7D:
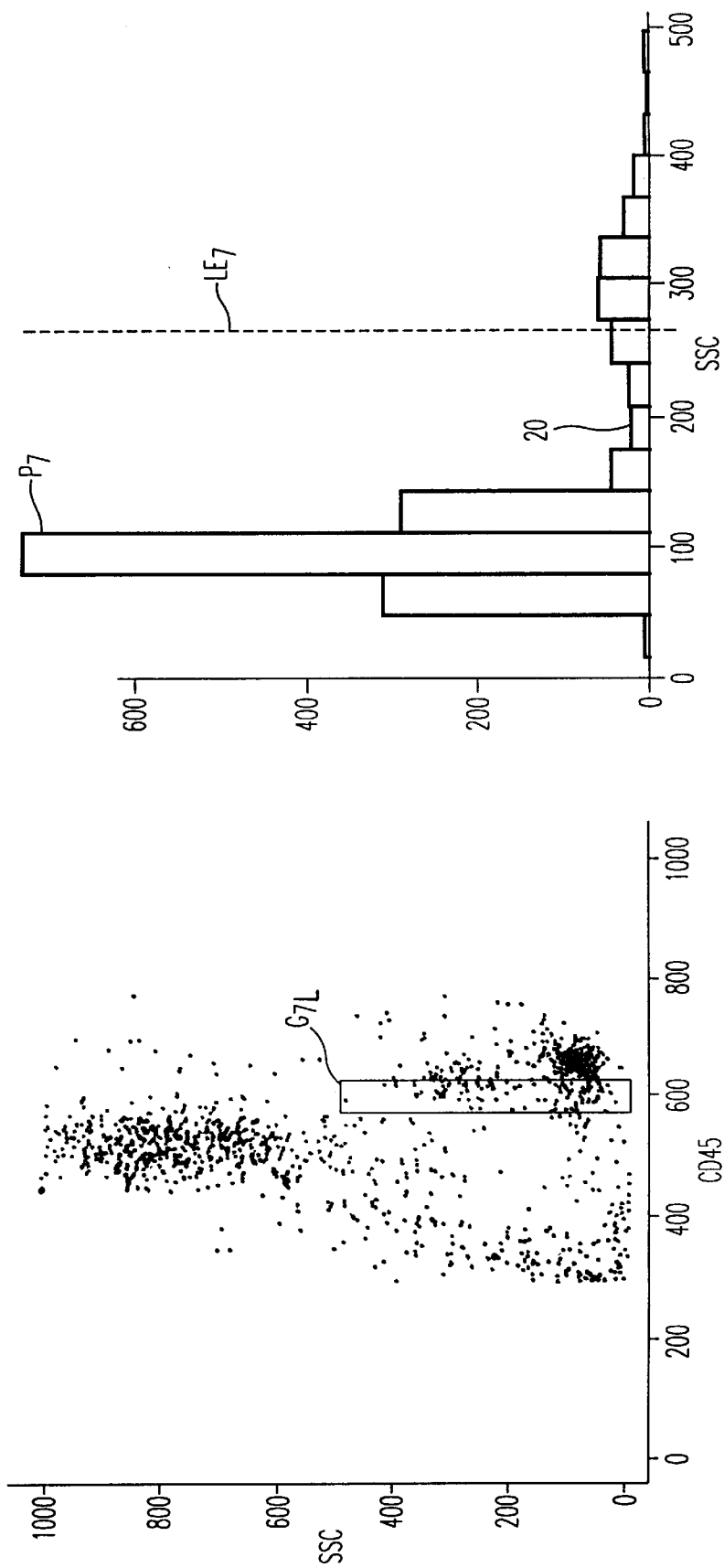
FIG. 7C is the two-dimensional scatter plot of SSC vs. CD45 illustrated in FIG. 7A but with the rectangular gate shifted to the left
FIG. 7D is a histogram of the two-dimensional scatter plot illustrated in FIG. 7C.

Let α denote the index (in order from the left side of the histogram) of the lowest bin, and let $h_\alpha^R$ be the number of events in the bin.SSC.right.valley is the midpoint of the αth bin.
7. Calculate the following indicator variables for later use:
   See FIG. 7D is which
     Peak $P_7$ is (yCtr)
     lymphe.edge is $LE_7$ The lowest bin 20 is between the peak $P_7$ and the $LE_7$ and is called bin $\alpha$, with bins to the right thereof being bin $\alpha+1$, 2, etc. and bins to the left thereof being bin $\alpha-1$, 2, 3 etc.

Subtask 3: Determine SSC.left.valley.

8. Extract the events that fall within the rectangular gate $G_{7L}$ shown in FIG. 7C. This rectangle is located just to the left of the gate used above and is defined as follows:
   a. Left boundary=x.Left.Lymph+3/6*(xCtr−x.Left.Lymph).
   b. Right boundary=x.Left.Lymph+5/6*(xCtr−x.Left.Lymph).
   c. Lower boundary=y.Lymph.Bottom.
   d. The upper boundary is fixed at 500.
   e. Events on the rectangle boundary are not included.

9. Create a histogram of the SSC data from the rectangle-gated events exactly as was done in Step 2, i.e. using a bin width of 32, etc. The only difference is in notation:
   a. Let $(b_i^L, b_{i+1}^L)$ denote the boundaries of ith bin. (L is for left.)
   This is called the left histogram since it is derived from data taken from a slice to the left of the histogram constructed in Step D.2.

10. Find the bin in the left histogram that contains the value yCtr that was found earlier in Step D.3. Call this bin the left.pseudopeak bin. Essentially, we are using the location of the right histogram peak as a substitute for the actual peak of the left histogram.

11. Find the bin containing the fewest events (the lowest bin) in the histogram that is between bin $\beta^L$ and the left.pseudopeak bin, inclusive, where
   $\beta^L$ is the greatest positive integer i that satisfies $b_{i+1}^L \leq$ lymph.edge.
   If there is a tie for the lowest bin, denote the leftmost of the tied bins as the lowest bin.
   SSC.left.valley is the midpoint of the lowest bin.

Subtask 4. Determine the slope and intercept of the upper boundary of the lymphocyte gate.

12. Determine ymidpt and y which are used in calculating the slope and intercept. The function plogis is described in the appendix.

bin.size←32
if (SSC.left.valley=SSC.right.valley)
{ if (4.35*indicator.1−0.313*indicator.2>0.75)
    { ymidpt←SSC.right.valley+2/3*bin.size
      offset←−4/10 }
  else
    { ymidpt←SSC.right.valley+1/3*bin.size
      offset←−3/10 }
}
if (SSC.left.valley<SSC.right.valley)
{ if (indicator.1≦0.4)
    ymidpt←SSC.right.valley−(SSC.right.valley−SSC.left.valley)/3
  else
    ymidpt←SSC.right.valley
  offset←−3/10
}
if (SSC.left.valley>SSC.right.valley)
{ ymidpt←SSC.left.valley+(SSC.right.valley−SSC.left.valley)/2
  offset←−4/10
}
y←offset+4/10*plogis((ymidpt−yCtr)/(xCtr−x.Left.Lymph), 1.2, 0.2)

13. Calculate the slope and intercept from the following equations:
   a. slope←(1−y)*(ymidpt−yCtr)/(xCtr−x.Left.Lymph)
   b. intercept←ymidpt−slope*xCtr A final few calculations are needed to generate the variable factor which is used later in the algorithm.

14. Let $\zeta$ be the index of the bin containing ymidpt. Specifically, $\zeta$ is the greatest integer i such that $b_i^R \leq$ ymidpt.

15. Calculate indicator.3:
   indicator.3←$(h_{\zeta-2}^R + h_{\zeta-1}^R)/(h_{max}^R + 1)$.

16. Calculate factor for use in later parts of the algorithm:
   factor←1−plogis( indicator.3, 0.03, 0.15)+1/4.

Four values are obtained from this part of the algorithm that are used elsewhere:
(1) slope, slope of the upper boundary of the gate found in Step 13,
(2) intercept, intercept of the upper gate boundary found in Step 13,
(3) The center of the lymphocyte cluster in SSC called yCtr found in Step 3,
(4) A variable used in scaling the upper right corner of the gate called factor, determined in Step 16.

E. Find the Right Extent of the Lymphocyte Cluster

The procedure described in this section is used to determine the value of the variable right.edge, a number that describes how far the lymphocyte cluster extends to the right, that is, how far it extends in the CD45 dimension. No gate vertices are set in this section, but right.edge is used extensively in the next section to position several of the vertices on the right side of the gate.

The calculations in this part of the algorithm are performed on data from a rectangular slice taken from the upper right corner of the lymphocyte cluster. The exact location of this slice is determined from information gained in earlier steps of the algorithm; specifically, the lower left corner of the slice is positioned at the cluster center, and the location of the upper left corner is determined by the slope and intercept found in the preceding section. The right corners of the slice take a little more effort to calculate and require returning to the CD45 histogram generated in Section B. Based on the shape of this histogram, the algorithm calculates a position that ensures that the right edge of the cluster is within the slice.

The following variable names are used in the description below to refer to values determined in earlier sections of the algorithm:

CD45.hist=CD45 histogram generated in Section B, Steps 1 and 2, $h_{max}^{CD45}$=number of events in the peak bin of $CD45$.hist from Section B, Step 3, xCtr=CD45 lymphocyte cluster center determined in Section B, Step 3, yCtr=SSC lymphocyte cluster center found in Section D, Step 3, slope=slope of the upper boundary of the gate found in Section D, Step 13, intercept=intercept of the upper gate boundary found in Section D, Step 13.

Algorithm Steps

Figure 8C:
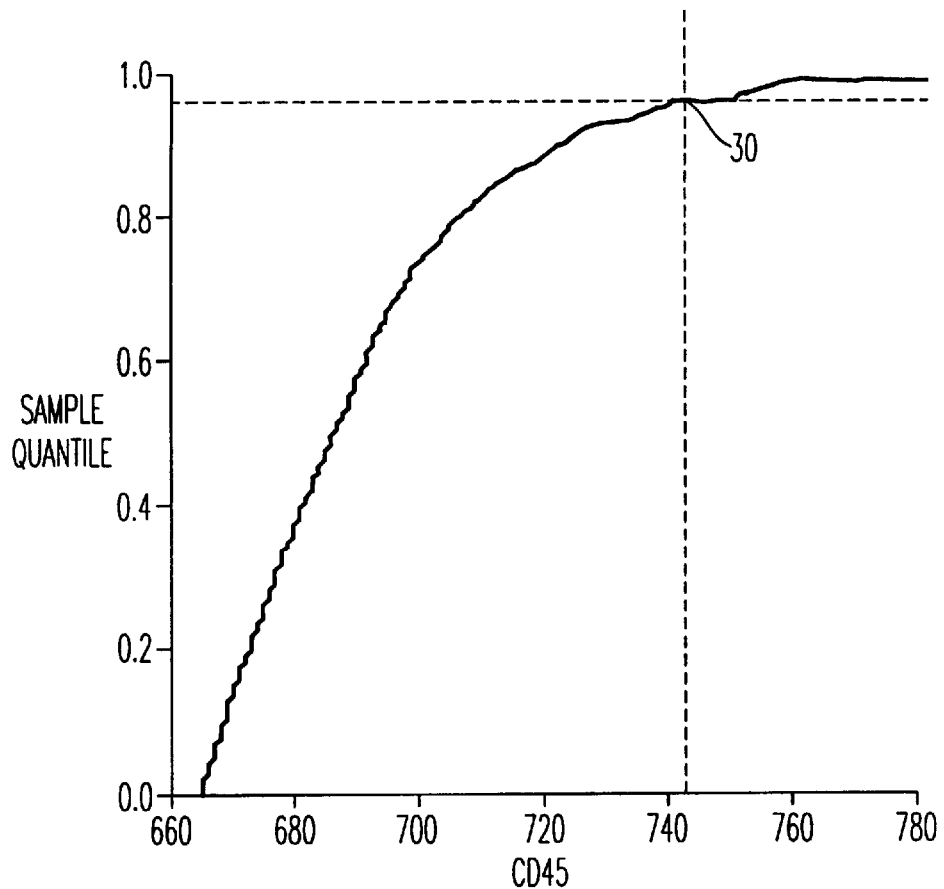
FIG. 8A is yet another two-dimensional scatter plot of SSC vs. CD45
FIG. 8B is a histogram of the two-dimensional scatter plot illustrated in FIG. 8A, with FIG. 8C being a graph of Sample Quantile vs. CD45.

1. Searching to the left from xCtr, find the first bin in the histogram that contains fewer than. 0.35*$h_{max}^{CD45}$ events, as shown in FIG. 8B. This is done analogously to the search procedure used in Section C, Step 4 and in Section D, Step 4.
  a. Let left.shoulder (LS$_7$)=the midpoint of the bin that satisfies this condition.
  b. If no bin satisfies this condition, abort gating algorithm and set an error flag.
2. Searching to the right from xCtr, find the first bin in the histogram that contains fewer than 0.35*h$_{max}^{CD45}$ events. This is the same procedure as used in the preceding step only here the search is to the right.
  a. Let right.shoulder (RS$_7$)=the midpoint of the bin that satisfies this condition.
  b. If no bin satisfies this condition, abort gating algorithm and set an error flag.
3. Extract the events that fall within the rectangular slice (gate G$_8$) shown in FIG. 8A.
  The coordinates of this rectangle are defined as follows:
  a. Left boundary=xCtr.
  b. Right boundary=xCtr+2*(right.shoulder−left.shoulder).
  c. Lower boundary=yCtr.
  d. Upper boundary=slope*xCtr+intercept.
  e. Events on the rectangle boundary are not included.
4. Referring to FIG. 8C, find the 0.96 sample quantile 30 of the CD45 data from the slice:
  a. Let n be the number of events in the slice.
  b. Rank the data from smallest to largest. Denote the ranked points $X_{(1)}, \ldots, X_{(n)}$, where $x_{(1)}$ is the smallest point and $x_{(n)}$ is the largest.
  c. Solve 0.96=(υ−1)/(n−1) for υ. Let υ=ceiling(υ); let υ=floor(υ).
  d. Calculate the 0.96 quantile: $\hat{q}_{0.96} \leftarrow x_{(\underline{\upsilon})}+(\upsilon-\underline{\upsilon})(x_{(\overline{\upsilon})}-x_{(\underline{\upsilon})})$
  e. Set right.edge←$\hat{q}_{0.96}$.
One value from this part of the algorithm is used elsewhere:
  (1) right.edge, a number found in Step 4 that describes how far the lymphocyte cluster extends in the CD45 dimension.

F. Building the Gate

The final section of the algorithm is where the vertices of the lymphocyte gate are determined using values obtained in the preceding sections. In particular, the following variable names are used to refer to values found in other sections of the algorithm:

xCtr=CD45 lymphocyte cluster center found in Section B, Step 3,
x.Left.Lymph=left boundary of the lymphocyte gate found in Section B, Step 5,
y.Lymph.Bottom=lower boundary of the lymphocyte gate found in Section C, Step 5,
yCtr=SSC lymphocyte cluster center found in Section D, Step 3,
slope=slope of the upper boundary of the gate found in Section D, Step 13,
intercept=intercept of the upper gate boundary found in Section D, Step 13,
factor=scaling variable determined in Section D, Step 16,
right.edge=extent of lymphocyte cluster in CD45 dimension from Section E, Step 4.

Figure 9:
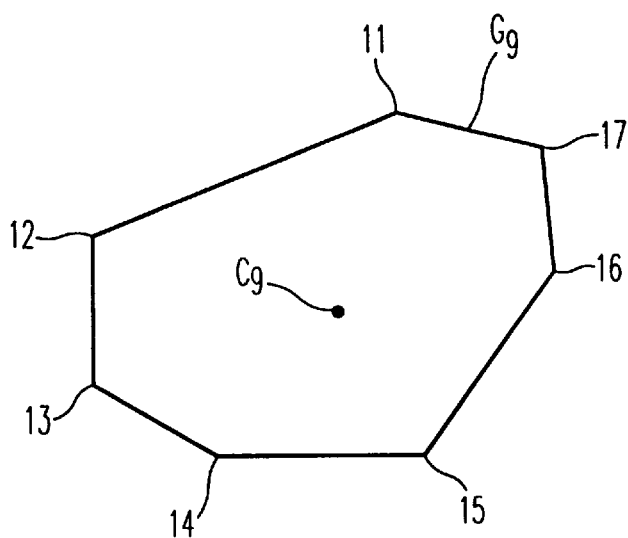
FIG. 9 is a schematic representation illustrating the vertices of the polygon gate of the present invention.

Referring to FIG. 9, the locations of the vertices of polygon gate G$_9$ are as follows:

Vertex 11, Upper Middle 1(x,y)
Vertex 12, Upper Left (x,y)
Vertex 13, Lower Left (x,y)
Vertex 14, Lower Middle (x,y)
Vertex 15, Lower Right (x,y)
Vertex 16, Upper Right (x,y)
Vertex 17, Upper Middle 2(x,y)
With the center C$_9$ of the gate G$_9$ being (xCtr,yCtr).

Algorithm Steps

1. Calculate Upper Left vertex:
   x←x.Left.Lymph
   y←slope*x.Left.Lymph+intercept
2. Calculate Lower Left vertex:
   x←x.Left.Lymph
   y←yCtr−(yCtr−y.Lymph.Bottom)/2
3. Calculate Lower Middle vertex:
   x←x.Left.Lymph+(xCtr−x.Left.Lymph)/2
   y←y.Lymph.Bottom
4. Calculate Lower Right vertex:
   x←xCtr+0.8*(right.edge−xCtr)
   y←y.Lymph.Bottom
5. Calculate Upper Middle 1 vertex:
   x←xCtr+3/2*(1−factor)*(right.edge−xCtr)
   y←slope*{Upper Middle 1 x}+intercept
6. Calculate Upper Middle 2 vertex:
   x←xCtr+(3+factor)*(right.edge−xCtr)/2
   y.Up.Right←{Lower Left y}+3/4*({Upper Left y}−{Lower Left y})
   y←{Upper Middle 1 y}−factor*({Upper Middle 1 y}−y.Up.Right)/3
7. Calculate Upper Right vertex:
   α←({Upper Middle 2 y}−y.Lymph.Bottom)/(right.edge−xCtr)
   β←1.8+0.8*plogis(α, 3.5, 0.5)
   x←xCtr+β*(right.edge−xCtr)
   y←y.Up.Right Appendix: plogis Function Plogis is an implementation of the logistic distribution function that is used in many places in the algorithm. It is sometimes called a "squashing function" since its purpose is to transform values from anywhere on the real line [−∞, +∞] to within the small, unit interval [0,1]. In essence a logistic transformation scales a variable so that it can never assume a value less than 0 or greater than 1. This behavior can reduce the need to check whether values are out of bounds since they are constrained to be within [0,1].

The logistic distribution function depends on two parameters, a and b, and is defined by $$F(x) = \frac{1}{1 + \exp\{-(x-a)/b\}}.$$

The calling sequence used in the pseudo code in the description is plogis( x, a, b ).

In addition, it should also be appreciated that the method of the present invention may be utilized in connection with setup and quality control of a flow cytometer. In this way, the method can be used to detect bad tubes, i.e., tubes that differ from the established value for a patient by a significant amount, which may be caused by improper mixing of the sample, poor dispersing of reagent and or blood, pipettes not properly calibrated, over or under incubation of sample, over or under lysing of sample, sample on the sides of the tube, MAb placed on the side of the tube and stained sample exposed to light.

While the preferred embodiment of the present invention has been described so as to enable one skilled in the art to practice the device of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. An automated method for classifying particles in at least one sample into one or more data clusters, comprising the steps of:

automatically collecting a plurality of parameters for each of a plurality of particles in a sample;

automatically plotting each particle on a two-dimensional scatter plot; and automatically constructing at least one geometric boundary on the two-dimensional scatter plot so as to enclose a group of the plotted particles in a data cluster, said boundary having a polygonal shape defined by a plurality of vertices and being constructed by creating at least one one-dimensional histogram from a cross-section of the two-dimensional scatter plot.

2. The automated method defined in claim 1, wherein said cross-section of said scatter plot comprises a rectangular two-dimensional gate.

3. The automated method defined in claim 2, further comprising the step of:

selecting bins for said histogram which are larger than a single channel.

4. The automated method defined in claim 3, wherein said step of selecting bins for said histogram includes selecting bins of at least 20 channels.

5. The automated method defined in claim 2, wherein the position of at least one side of said rectangular two-dimensional gate corresponds to a predetermined numerical value.

6. The automated method defined in claim 2, wherein the position of at least one side of said rectangular two-dimensional gate is derived from a feature of said scatter plot.

7. The automated method defined in claim 6, wherein said feature is selected from the group consisting of the center of a cluster of plotted particles and a valley between two clusters of plotted particles.

8. The automated method defined in claim 6, wherein said feature is derived from a characteristic of a second one-dimensional histogram created from a cross-section of said scatter plot.

9. The automated method defined in claim 8, wherein said characteristic is selected from the group consisting of a maximum of said second one-dimensional histogram and a minimum of said second one-dimensional histogram.

10. The automated method defined in claim 1, wherein a plurality of one-dimensional histograms are created from cross-sections of said two-dimensional scatter plot to construct said geometric boundary, each of said histograms having bins larger than a single channel, and the number of channels per bin being different for different ones of said histograms.

11. The automated method defined in claim 1, wherein said geometric boundary includes at least one side which extends at an angle with respect to the axes of the scatter plot, and further comprising the step of determining the slope or intercept of said at least one side from said at least one one-dimensional histogram.

12. An automated method for evaluating a sample containing a plurality of particles, comprising the steps of:

automatically collecting a plurality of parameters for each of said plurality of particles in said sample;

automatically plotting each particle on a two-dimensional scatter plot;

automatically creating a one-dimensional histogram from a cross-section of said two-dimensional scatter plot; and automatically analyzing said one-dimensional histogram to evaluate said sample.

13. The automated method defined in claim 12, wherein the step of automatically analyzing said histogram includes automatically identifying a characteristic of said histogram.

14. The automated method defined in claim 12, wherein the step of automatically analyzing said histogram includes automatically identifying a minimum or maximum of said histogram.

15. The automated method defined in claim 12, wherein the step of automatically analyzing said histogram includes automatically constructing a geometric boundary on said scatter plot to classify a group of said plotted particles.

16. The automated method defined in claim 15, wherein said geometric boundary comprises a polygon enclosing said group of plotted particles in a data cluster.

17. An automated system for evaluating a sample containing a plurality of particles, comprising:

means for automatically collecting a plurality of parameters for each of said plurality of particles in said sample;

means for automatically plotting each particle on a two-dimensional scatter plot;

means for automatically creating a one-dimensional histogram from a cross-section of said two-dimensional scatter plot; and means for automatically analyzing said one-dimensional histogram to evaluate said sample.

18. The automated system defined in claim 17, wherein said means for automatically analyzing said histogram includes means for automatically identifying a characteristic of said histogram.

19. The automated system defined in claim 17, wherein said means for automatically analyzing said histogram includes means for automatically identifying a minimum or maximum of said histogram.

20. The automated system defined in claim 17, wherein said means for automatically analyzing said histogram includes means for automatically constructing a geometric boundary on said scatter plot to classify a group of said plotted particles, said geometric boundary comprising a polygon enclosing said group of plotted particles in a data cluster.

* * * * *